(12) United States Patent
Kolman et al.

(10) Patent No.: US 9,967,275 B1
(45) Date of Patent: May 8, 2018

(54) EFFICIENT DETECTION OF NETWORK ANOMALIES

(71) Applicant: EMC Corporation, Hopkinton, MA (US)

(72) Inventors: Eyal Kolman, Tel Aviv (IL); Kineret Raviv, Herzliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 173 days.

(21) Appl. No.: 14/972,613

(22) Filed: Dec. 17, 2015

(51) Int. Cl.
*H04L 29/06* (2006.01)

(52) U.S. Cl.
CPC .............................. *H04L 63/1425* (2013.01)

(58) Field of Classification Search
CPC .................................................. H04L 63/1425
See application file for complete search history.

(56) References Cited

U.S. PATENT DOCUMENTS

| 8,087,079 | B2 * | 12/2011 | Ben-Itzhak | G06F 21/562 726/22 |
| 8,504,879 | B2 * | 8/2013 | Poletto | H04L 41/064 709/224 |
| 8,611,219 | B2 * | 12/2013 | Golic | H04L 43/022 370/235 |
| 2004/0117478 | A1 * | 6/2004 | Triulzi | H04L 63/1416 709/224 |
| 2007/0280114 | A1 * | 12/2007 | Chao | H04L 43/0888 370/235.1 |
| 2017/0063902 | A1 * | 3/2017 | Muddu | H04L 63/1425 |
| 2017/0070527 | A1 * | 3/2017 | Bailey | H04L 63/1416 |

\* cited by examiner

*Primary Examiner* — Mahfuzur Rahman
(74) *Attorney, Agent, or Firm* — BainwoodHuang (57) ABSTRACT

Techniques of identifying anomalous behavior on an electronic network involve iteratively combining groups of adjacent bins of a histogram in such a way as to minimize a measure of error in the histogram. Along these lines, a user behavior analytics server represents a user behavior factor with a histogram. The UBA server reduces a number of bins in the histogram by iteratively selecting groups of adjacent bins for combination. Upon each iteration, the group of bins that is selected for combination is the group which, when its bins are combined, minimizes differences between the values of the bins in that group and a value of the combined bin.

20 Claims, 4 Drawing Sheets

EFFICIENT DETECTION OF NETWORK ANOMALIES

BACKGROUND

Electronic networks allow users remote access to electronic resources. For example, a user may access a virtual private network (VPN) in order to conduct a work session using data stored on a server at work from a computer at his or her home. Typically, the user authenticates to the VPN in order to demonstrate that the user is the person he or she purports to be.

One risk of allowing users remote access to electronic resources is that an imposter may misappropriate a user's login in order to fraudulently gain access to the electronic resources. In order to detect such malicious activity, tools such as User Behavior Analytics (UBA) identify anomalous behavior on electronic networks. Such behavior is described by any number of behavioral factors (e.g., VPN session length, source IP address, etc.). For example, consider a user who has a history of VPN sessions that last between 30 minutes and 2 hours. If this user suddenly connects to the VPN in sessions lasting less than 5 minutes or greater than 6 hours, then a UBA system may flag such behavior as anomalous and send an alert to an administrator. The administrator may then investigate the sessions to determine whether remedial action is needed.

SUMMARY

Unfortunately, there are deficiencies with the above-described conventional approach to identifying anomalous behavior. For example, the conventional approach may impose large computational burdens on computer equipment tasked with accurately detecting anomalous behavior. For example, a UBA system may represent a user's past network behavior using a collection of histograms, such as one histogram for each behavioral factor to be monitored. Each histogram typically includes many bins, with such bins having equal widths and greater numbers of bins providing greater accuracy. However, using histograms with large numbers of bins places a computational burden on the computing resources tasked with performing UBA. For example, when evaluating a current behavioral factor of a user, UBA compares that factor with a respective histogram. The more bins contained in the histogram, the larger the computational burden of performing UBA.

Along these lines, a UBA system may implement a histogram including a large number of equal-width bins. However, it is often the case that groups of adjacent bins exhibit very little variation in frequency. In such a case, it is wasteful to keep such a large number of bins. Accordingly, one may decrease the number of bins by increasing the width of each bin. Although reducing the number of bins helps to relieve processing burdens, doing so introduces errors that undermine the accuracy of UBA.

In contrast with the above-described conventional approach, improved techniques of identifying anomalous behavior on an electronic network involve iteratively combining groups of adjacent bins of a histogram in such a way as to minimize a measure of error in the histogram. Along these lines, a UBA server represents a user behavior factor with a histogram having many bins. The UBA server then reduces the number of bins by iteratively selecting groups of adjacent bins for combination. Upon each iteration, the group of bins that is selected for combination is the group which, when its bins are combined, minimizes differences between the values of the bins in that group and a value of the combined bin.

Advantageously, the improved techniques reduce the number of bins that are processed in performing UBA. However, such reductions are performed so as to minimize error, e.g., by coalescing bins in areas of low data variability while preserving distinct bins in areas of high data variability. Therefore, the improved techniques hereof reduce the number of bins used to perform UBA without incurring a proportional reduction in accuracy.

One embodiment is directed to a method of identifying anomalous use of an electronic network. The method includes generating, by processing circuitry, a histogram from values of a user behavior factor of a user, the histogram including bins, each bin (i) representing a range of the user behavior factor and (ii) having a value indicative of a relative frequency of the behavior factor in the range represented by that bin. The method also includes receiving, by the processing circuitry after generating the histogram, network data indicating that an alleged user is interacting with the electronic network. The method further includes, in response to receipt of the network data, (i) identifying, by the processing circuitry, a value of a behavior factor from the network data, (ii) comparing the value of the behavior factor with the histogram to identify a bin of the histogram that encompasses the behavioral factor; and (iii) indicating anomalous use of the electronic network in response to the identified bin of the histogram having a lower value than values of other bins in the histogram. Generating the histogram includes performing multiple bin-reduction iterations, each bin reduction iteration including (i) selecting, by the processing circuitry, a group of adjacent bins of the histogram for combination into a combined bin, the group of bins selected to minimize differences between a value of the combined bin and the values of the bins in that group, and (ii) combining the bins of the selected group to form the combined bin, the combined bin replacing the bins of the selected group in the histogram and the value of the combined bin being based on the values of each of the bins in the selected group.

Additionally, some embodiments are directed to a system constructed and arranged to identify anomalous use of an electronic network. The system includes memory and controlling circuitry constructed and arranged to carry out a method of identifying anomalous use of an electronic network.

Further, some embodiments are directed to a computer program product having a non-transitory computer readable storage medium that stores instructions which, when executed by a computer, cause the computer to carry out the method of identifying anomalous use of an electronic network.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of identifying anomalous behavior on an electronic network involve iteratively combining groups of adjacent bins of a histogram in such a way as to minimize a measure of error in the histogram. Advantageously, the improved techniques reduce the number of bins of histograms used in performing User Behavior Analytics (UBA) without unduly sacrificing accuracy.

Figure 1:
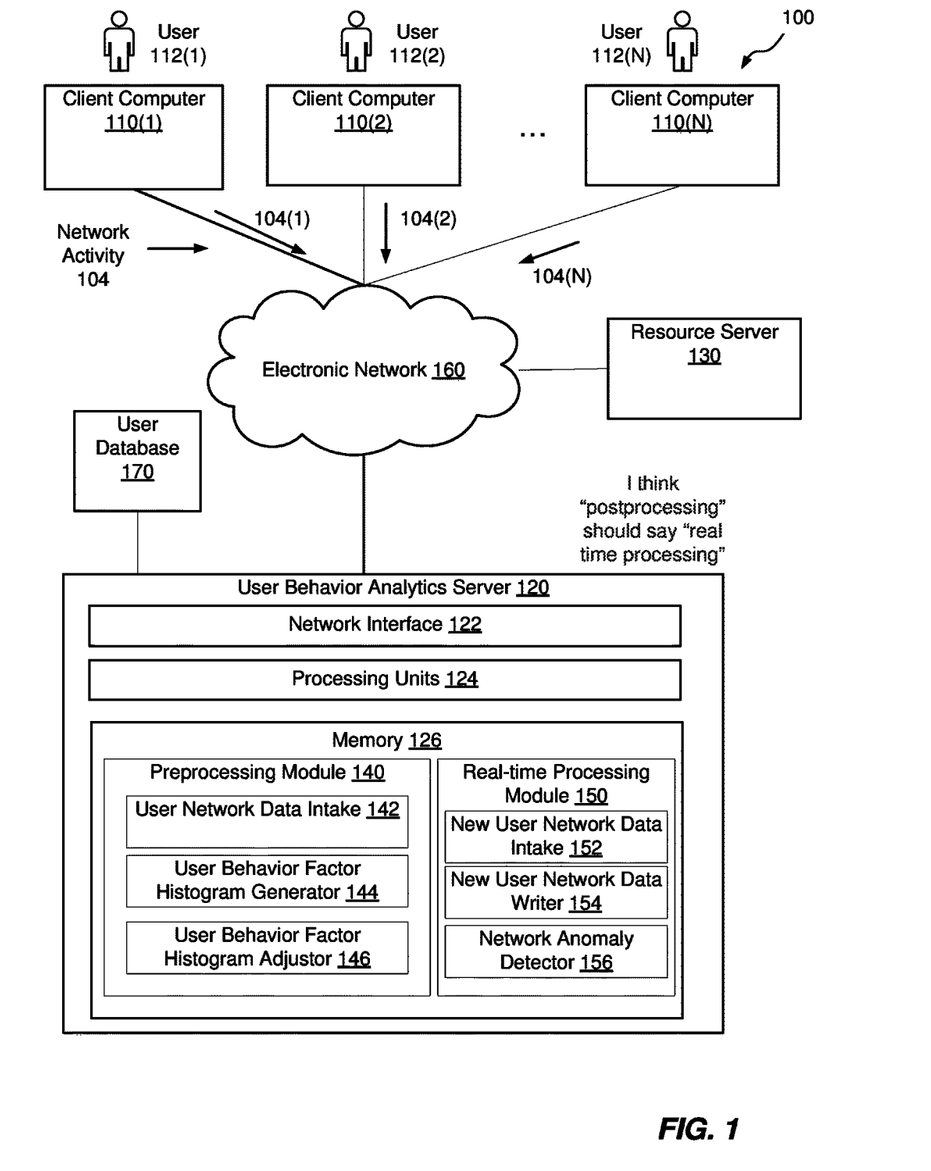
FIG. 1 is a block diagram illustrating an example electronic environment in which the improved technique can be carried out.

FIG. 1 shows an example electronic environment 100 in which embodiments of the improved techniques hereof can be practiced. Here, electronic environment 100 includes a set of client computers 110(1), 110(2), . . . , 110(N), a user behavior analytics (UBA) server 120, a resource server 130, an electronic network 160, and a user database 170.

Each of the client computers 110(1), 110(2), . . . , 110(N) is configured to access electronic resources on resource server 130 via electronic network 160. For example, user 112(1) on client computer 110(1) may conduct a VPN session with resource server 130 in order to read and edit particular documents stored in the resource server 130. Accordingly, client computers 110(1), 110(2), . . . , 110(N) may take the form of desktop or laptop computers, as well as tablet computers, smartphones, or the like.

The UBA server 120 is configured to identify anomalous use of the electronic network 160. As illustrated in FIG. 1, the UBA server 120 is implemented as a computer system that is in communication with the client computers 110(1), 110(2), . . . , 110(N) and the resource server 130 over the electronic network 160.

The UBA server 120 is seen to include one or more network interfaces 122, a set of processing units 124, and memory 126. The network interfaces 122 include, for example, Ethernet adapters, Token Ring adapters, and the like, for converting electronic and/or optical signals received from the electronic network 160 to electronic form for use by the UBA server 120. The set of processing units 124 include one or more processing chips and/or assemblies. The memory 126 includes both volatile memory (e.g., RAM), and non-volatile memory, such as one or more ROMs, disk drives, solid state drives, and the like. The set of processing units 124 and the memory 126 together form control circuitry, which is constructed and arranged to carry out various methods and functions as described herein.

The memory 126 includes a variety of software constructs realized in the form of executable instructions, such as a preprocessing module 140 and a real-time processing module 150. When the executable instructions are run by the set of processing units 124, the set of processing units 124 are caused to carry out the operations of the software constructs. Although certain software constructs are specifically shown and described, it is understood that the memory 126 typically includes many other software constructs, which are not shown, such as an operating system, various applications, processes, and daemons, for example. The memory 126 is also constructed and arranged to store various data.

The preprocessing module 140 is configured to set up the user behavior analytics server to process user network data for identifying anomalous network behavior. The preprocessing module 140 includes submodules such as a user network data intake 142, a user behavior factor histogram generator 144, and a user behavior factor histogram adjustor 146.

The user network data intake 142 is configured to read prior user network data from the user database 170. Typically, the user network data intake 142 takes in values of user behavior factors stored in the user database 170 within a certain time period, e.g., 30 days. Also, the user network data intake 142 typically operates in the background or during a downtime when the UBA server 120 is not receiving new values of the user behavior factors from the electronic network 160.

The user behavior factor histogram generator 144 is a software construct configured to generate histograms from prior user network data read in by the user network data intake 142. Specifically, the user behavior factor histogram generator 144 generates a histogram from values of a respective user behavior factor for a particular user (e.g., user 112(1)). The histogram is a data structure that includes multiple bins, where each bin represents a range of the respective user behavior factor. Each bin has a width equal to the difference between the max and min of the range it represents, and a value providing a frequency or number of times the respective user behavior factor has taken on a value in that range.

In an example, the histogram initially generated by the user behavior factor histogram generator 144 has about 200 equal-width bins. In such a configuration, it is possible that bins in certain regions may have little variation from bin to bin. Such a situation gives rise to inefficiencies in real-time operation because, as will be described, the UBA server 120 performs processing for each bin during the real-time processing phase of its operation.

For example, if the entire range of the VPN session length is between 0 and 24 hours and there are 240 bins, then each bin spans a width of 0.1 hours, or 6 minutes. Typically, the values are defined such that the sum of the values of all the bins is equal to one Accordingly, the user behavior factor histogram adjustor 146 is configured to adjust the bins of the histogram to achieve efficiency without losing much in the way of predictive accuracy. For example, a goal of the user behavior factor histogram adjustor 146 may be to reduce the number of bins in regions that have little variation from one bin to the next. In that way, the real-time processing may become more efficient.

The real-time processing module 150 is configured to determine whether new user network activity 104 indicates anomalous behavior on the part of a user, e.g., user 112(1). The real-time processing module 150 includes submodules such as a new user network data intake 152, a new user network data writer 154, and a network anomaly detector 156.

The new user network data intake 152 is configured to obtain values of the user behavior factors while the client computers 110(1), . . . , 110(N) access electronic network 160. For example, when a client computer 110(1) establishes a VPN session with the resource server 130, the new user network data intake 152 monitors network activity 104(1) on the electronic network 160 between the client computer 110(1) and the resource server 130. As a result, the new user network data intake 152 can obtain values of user behavior factors from the network activity 104(1).

The network anomaly detector 156 is a software construct configured to determine whether there is anomalous network activity from the values of the user behavior factors obtained by the new user network data intake 152. For example, suppose that the user behavior factor histogram adjustor 146 provides an adjusted histogram of VPN session length for the user 112(1). Then, sometime later, the new user network data intake 152 obtains a value of a VPN session length from network activity 104(1). Accordingly, the network anomaly detector 156 determines which bin of the adjusted histogram represents the range of VPN session length containing the obtained value of the VPN session length. The network anomaly detector 156 ascertains whether the network activity 104(1) is indicative of anomalous user network behavior based on the determined bin.

The electronic network 160 provides network connections between the client computers 110(1), . . . , 110(N) and the user behavior analytics server 120. The electronic network 160 may implement any of a variety of protocols and topologies that are in common use for communications over the Internet or other networks. Further, the electronic network 160 may include various components (e.g., cables, switches/routers, gateways/bridges, etc.) that are used in such communications.

The user database 170 includes a storage device that stores an arrangement of values of user behavior factors obtained from network activity data 104. As shown in FIG. 1, the user database 170 is locally connected to the user behavior analytics server 120. However, in other arrangements, the user database 170 may be connected to the UBA server 120 via the electronic network 160 or any other network.

During example operation, the preprocessing module 140 begins assembling histograms of user behavior factors for various users 112(1), . . . , 112(N). As a specific example, the following discussion concerns a histogram describing a distribution of VPN session length for user 112(1). It should be understood that the preprocessing module 140 may operate on a wide range of other user behavior factors, such as amount of data exchanged per VPN session, number of login attempts, and so on, as well as behavioral factors for other users, e.g., user 112(2), . . . , 112(N), and that the preprocessing module 140 may assemble histograms for each of those, as well.

The user network data intake 142 begins the preprocessing process by obtaining prior values of the VPN session length for the user 112(1) from the user database 170. In some arrangements, the user network data intake 142 accesses the user database 170 at regular periods, e.g., nightly. Once the user database 170 has been accessed, the user network data intake 142 obtains values of the VPN session length for the user 112(1) within a specified time period, e.g., the most recent prior 30 days.

Once these VPN session length values have been obtained, the user behavior factor histogram generator 144 generates an initial histogram from the obtained values of the VPN session length for the user 112(1). The user behavior factor histogram generator 144 specifies the histogram as a set of values and corresponding bin boundaries. For example, each bin has a left boundary, a right boundary, and a value. Further, in some arrangements, the initial histogram generated by the user behavior factor histogram generator 144 has a specified initial number of equal-width bins.

Once the user behavior factor histogram generator 144 generates this initial histogram, the user behavior factor histogram adjustor 146 performs a bin-reducing adjustment to reduce the number of bins in the initial histogram. As will be described, the user behavior factor histogram adjustor 146 preferentially performs bin reductions in regions of the histogram where there is little bin-to-bin variability. The advantage of performing bin reduction in this manner is that computational needs are reduced while maintaining the effectiveness of the adjusted histogram in accurately predicting whether a particular VPN session length by the user 112(1) indicates anomalous network behavior.

Figure 2:
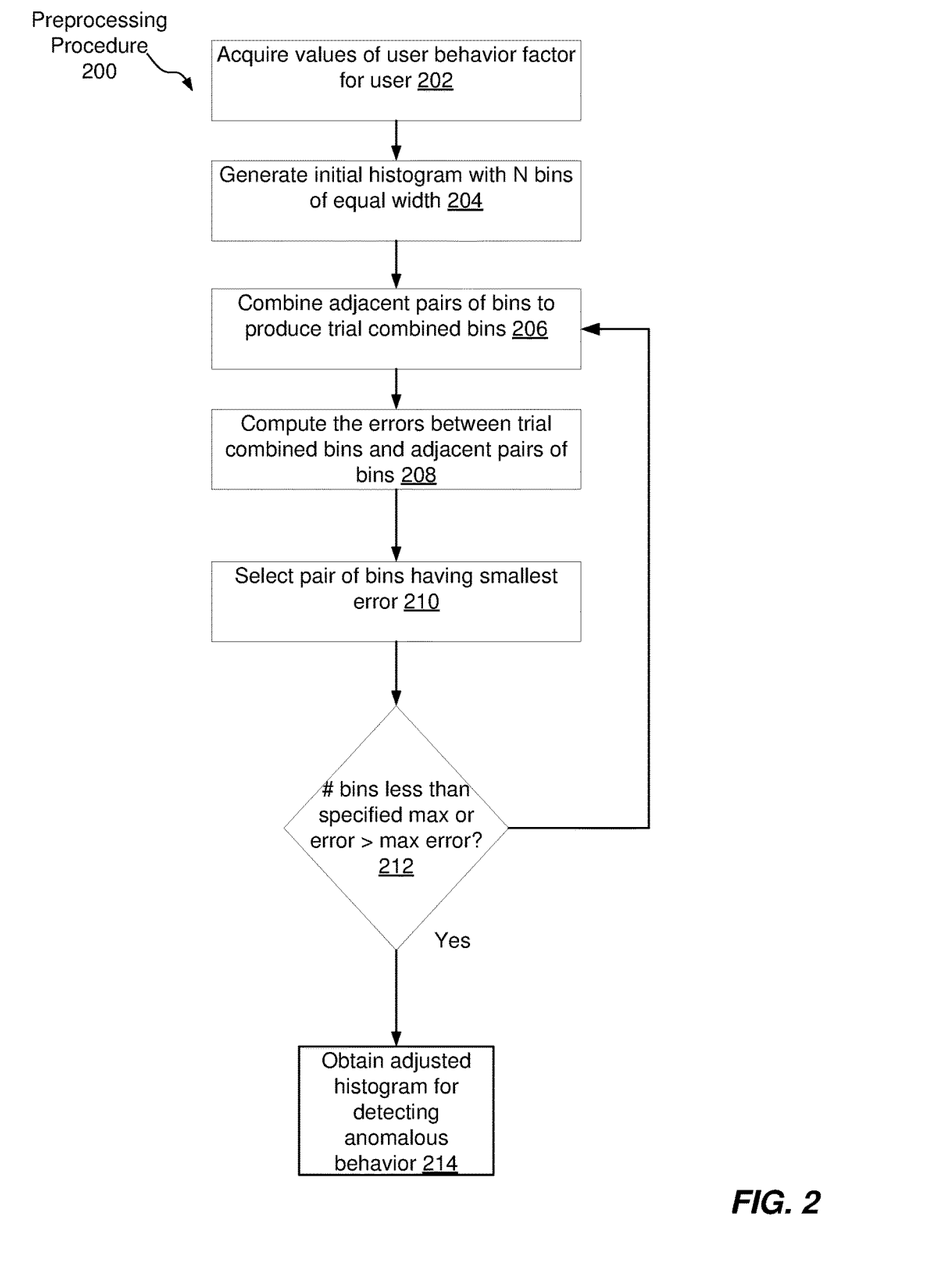
FIG. 2 is a flow chart illustrating an example preprocessing procedure within the electronic environment shown in FIG. 1.

FIG. 2 shows an example preprocessing procedure 200 that generates an adjusted histogram. At 202, the user network data intake 142 obtains values of the VPN session length for the user 112(1), e.g., within the most recent prior 30 days. At 204, the user behavior factor histogram generator 144 generates an initial histogram of the VPN session length, e.g., using 200 equal-width bins.

At 206, the user behavior factor histogram adjustor 146 begins the adjustment of the histogram by selecting a pair of adjacent bins for combination into a single, combined bin. To accomplish this selection, the user behavior factor histogram adjustor 146 performs a preliminary, trial combination operation on each pair of adjacent bins of the initial histogram. An example combination operation proceeds as follows. Let $w_i^{(1)}$ be the width of the ith bin and $v_i^{(1)}$ be its value. (It is noted that, in the initial histogram, all bins have equal widths. However, after successive iterations this will no longer be the case.) Then the width $w_i^{(2)}$ of the ith combined bin of the histogram is $w_i^{(2)} = w_i^{(1)} + w_{i+1}^{(1)}$, i.e., the sum of the widths of the adjacent pair of bins. Further, the value $v_i^{(2)}$ of the ith combined bin is $$v_i^{(2)} = \frac{w_i^{(1)} v_i^{(1)} + w_{i+1}^{(1)} v_{i+1}^{(1)}}{w_i^{(1)} + w_{i+1}^{(1)}},$$

i.e., a weighted average of the values of the adjacent pair of bins.

It should be understood that the above procedure can be generalized to groups of 3 or more adjacent bins rather than simply a pair. However, the discussion that follows will focus on adjacent pairs for simplicity.

It should also be understood that a histogram initially having 200 bins has 199 adjacent pairs. Thus, the user behavior factor histogram adjustor 146 computes the widths and values across 199 such trial combined bins, one for each of the adjacent pairs.

At 208, the user behavior factor histogram adjustor 146 then selects one of the 199 trial combined bins as follows. For each of the adjacent pairs, user behavior factor histogram adjustor 146 computes the error $e_i$ between the ith adjacent pair of bins and the ith trial combined bin using the following equation:

$$e_i = w_i^{(1)} |v_i^{(2)} - v_i^{(1)}| + w_{i+1}^{(1)} |v_i^{(2)} - v_{i+1}^{(1)}|.$$

The user behavior factor histogram adjustor 146 then selects a group for the current iteration as the pair of adjacent bins, say $i_o$, for which $e_i$ is a minimum. With the selection thereby made, the user behavior factor histogram adjustor 146 replaces the $i_o$th adjacent pair with the $i_o$th trial combined bin. Thus, the selected group of bins is replaced with a single combined bin that represents the group.

The procedure described above for selecting adjacent pairs of bins for combination may be performed iteratively. Typically, the user behavior factor histogram adjustor 146 will iteratively combine adjacent pairs of bins into combined bins until the number of bins has been reduced below some specified maximum number of bins in the adjusted histogram, e.g., 20. For the kth iteration, the equations for the width, value, and error of the ith combined bin (where now i ranges between 1 and 200-k) are as follows:

$$w_i^{(k+1)} = w_i^{(k)} + w_{i+1}^{(k)},$$

$$v_i^{(k+1)} = \frac{w_i^{(k)} v_i^{(k)} + w_{i+1}^{(k)} v_{i+1}^{(k)}}{w_i^{(k)} + w_{i+1}^{(k)}},$$

$$e_i = w_i^{(k)} |v_i^{(k+1)} - v_i^{(k)}| + w_{i+1}^{(k)} |v_i^{(k+1)} - v_{i+1}^{(k)}|.$$

Thus, at 212, the user behavior factor histogram adjustor 146 checks the value of k against the specified maximum number of bins in the adjusted histogram, e.g., 20. If k is greater than this number, then the user behavior factor histogram adjustor 146 increments k and combines another pair of adjacent bin into a combined bin. Otherwise, if k is equal to (or less than) this number, then at 214 the histogram has been adjusted for use in detecting anomalous behavior. Alternatively, in other arrangements, the user behavior factor histogram adjustor 146 may stop iterating when the error is less than a threshold error.

Figure 3:
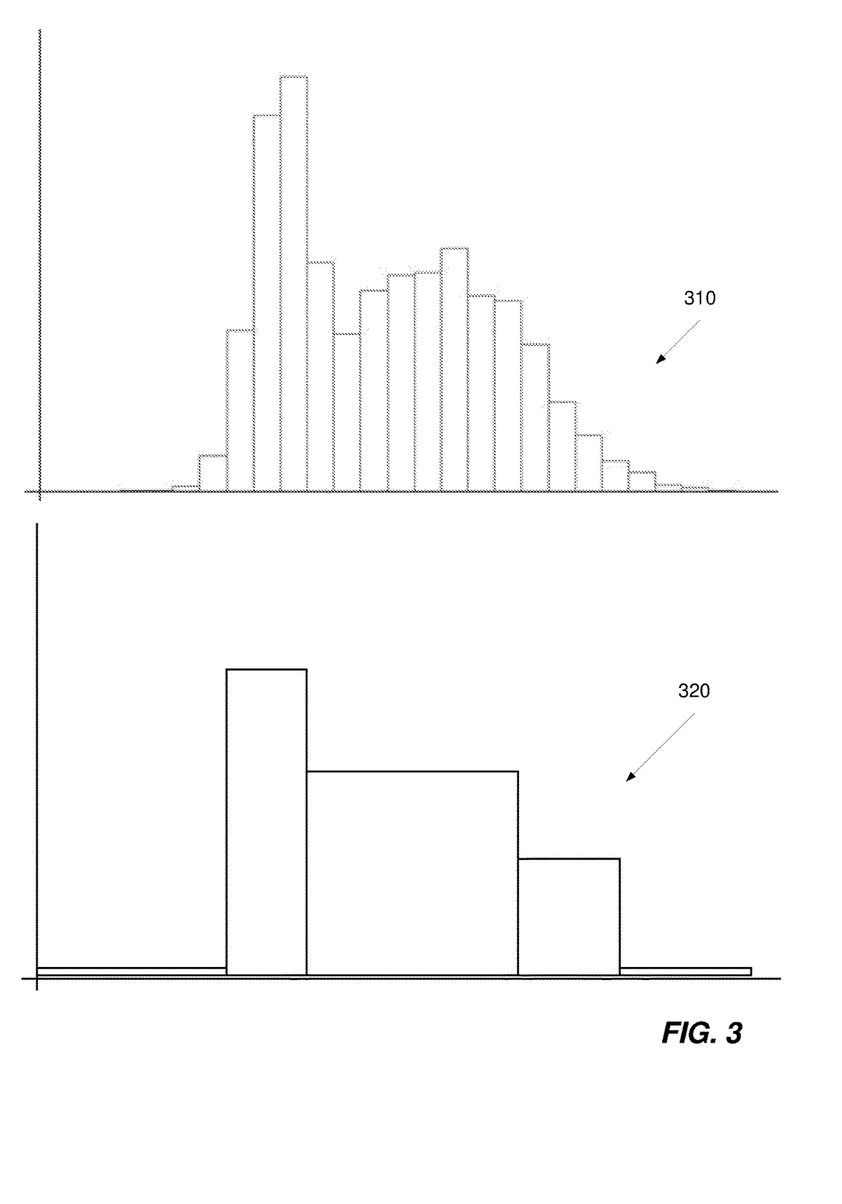
FIG. 3 is a diagram illustrating example histograms before and after the preprocessing procedure carried out within the electronic environment shown in FIG. 1.

FIG. 3 shows an example result of adjusting a histogram 310 as described above. The histogram 310 as shown in FIG. 3 has only about 20 bins rather than 200 for illustration purposes. In this case, the histogram 310 approximates a mixed-gaussian probability distribution function. In this case, the histogram 310 has regions of zero or near-zero activity at the ends of the region as well as other regions of relatively small bin-to-bin variation and large bin-to-bin variation.

Adjusted histogram 320 shows a result of the above procedure as applied to histogram 310. In this case, there are only 5 bins, so there have been presumably 15 iterations. Further, the widths of the bins of histogram 320 are larger in regions where there is little bin-to-bin variation in the histogram 310 and are smaller in regions where there is larger bin-to-bin variation in the histogram 310.

The benefit of using the adjusted histogram 320 should be clear from FIG. 3: fewer bins result in fewer computations for the UBA server 120 in matching a real-time behavior factor to a bin of the adjusted histogram. Thus, fewer computations are needed to determine whether there is any anomalous network behavior.

For example, the network anomaly detector 156 receives a new value of the VPN session length obtained by the new user network data intake 152 from the electronic network 160. From this value, the network anomaly detector 156 determines which bin represents a range that contains the new value. If the value of this bin is greater than a threshold value, or is greater than the values of neighboring bins, then the new value does not indicate anomalous behavior on the network. However, if the value of this bin is less than the threshold or is less than the values of neighboring bins, then the new value indicates anomalous behavior on the network.

Figure 4:
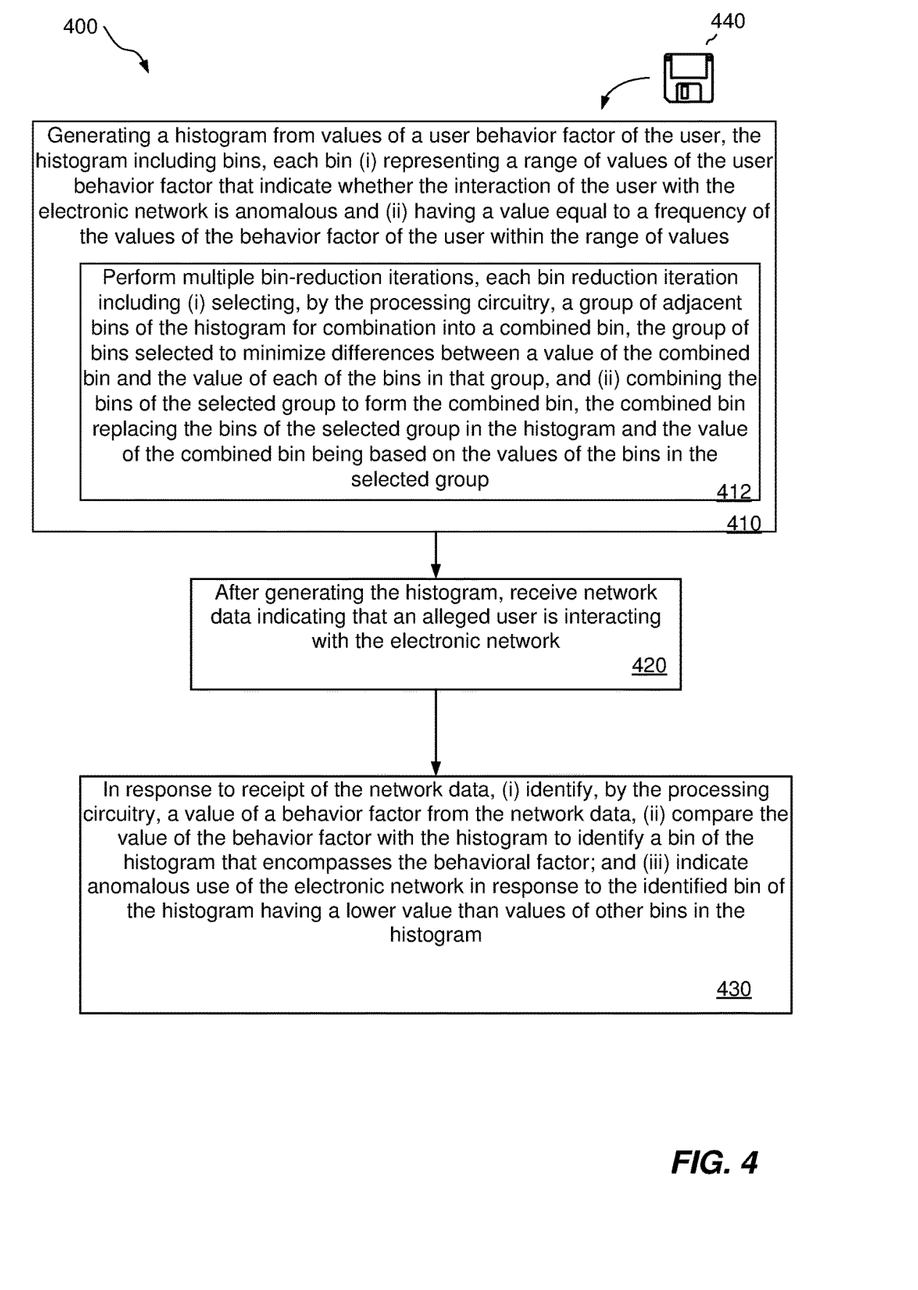
FIG. 4 is a flow chart illustrating an example method of processing the write requests within the electronic environment shown in FIG. 1.

FIG. 4 illustrates a method 400 of identifying anomalous use of an electronic network. The method 400 may be performed by the software constructs described in connection with FIG. 1, which reside in the memory 126 of the UBA server 120 and are run by the processing units 124.

At 410, a histogram is generated from values of a user behavior factor of a user, the histogram including bins, each bin (i) representing a range of the user behavior factor and (ii) having a value indicative of a relative frequency of the behavior factor in the range represented by that bin. In the example provided above, the user behavior factor is VPN session length. The user behavior factor histogram adjustor 146 generates a histogram that represents the VPN session length for a user.

At 420, after generating the histogram, network data indicating that an alleged user is interacting with the electronic network is received. Continuing the example provided above, after the user behavior factor histogram adjustor 146 generates (and adjusts) the histogram, the UBA server 120 receives network activity data 104 that contains a value of the VPN session length for the user.

At 430, in response to receipt of the network data, (i) a value of a behavior factor is identified from the network data, (ii) the value of the behavior factor is compared with the histogram to identify a bin of the histogram that encompasses the behavioral factor; and (iii) anomalous use of the electronic network is indicated in response to the identified bin of the histogram having a lower value than values of other bins in the histogram. Thus, if the value of the VPN session length for the user falls in a range represented by a bin having a small value, then anomalous behavior for that user may be indicated.

At 412, as part of generating the histogram, multiple bin-reduction iterations are performed, each bin reduction iteration including (i) selecting, by the processing circuitry, a group of adjacent bins of the histogram for combination into a combined bin, the group of bins selected to minimize differences between a value of the combined bin and the value of each of the bins in that group, and (ii) combining the bins of the selected group to form the combined bin, the combined bin replacing the bins of the selected group in the histogram and the value of the combined bin being based on the values of the bins in the selected group. For example, the user behavior factor histogram adjustor 146 iteratively reduces the number of bins by selecting a group of adjacent bins to combine based on minimizing error.

Improved techniques have been described for identifying anomalous behavior on an electronic network. The improved techniques involve iteratively combining groups of adjacent bins of a histogram in such a way as to minimize a measure of error in the histogram. Advantageously, the improved techniques reduce the number of bins of histograms used in performing User Behavior Analytics (UBA) and thus reduce the computational burden of performing UBA in real time. However, as the number of bins is reduced in areas of low variability, accuracy in performing UBA is maintained.

Having described certain embodiments, numerous alternate embodiments or variations can be made. For example, in some arrangements, the UBA server 120 and the resource server 130 may be co-located rather than separate machines as shown in FIG. 1.

One should appreciate that the above-described techniques do not merely adjust the widths of bins in a histogram. Rather, the disclosed techniques involve an improvement to an industrial process, namely improving security in an electronic network.

Further, with the above-described techniques, a computerized system that runs UBA operates more rapidly and efficiently, and thus enables more efficient analysis of behavioral factors for users.

In some arrangements, the UBA server 120 is implemented by a set of cores or other types of control/processing circuitry running software. In such arrangements, the software instructions can be delivered, within the user behavior analytics server 120, in the form of a computer program product 440. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is intended to be set forth in this document.

What is claimed is:

1. A method of identifying anomalous use of an electronic network, the method comprising:
   generating, by processing circuitry, a histogram from values of a user behavior factor of a user, the histogram including bins, each bin (i) representing a range of the user behavior factor and (ii) having a value indicative of a relative frequency of the behavior factor in the range represented by that bin;
   receiving, by the processing circuitry after generating the histogram, network data indicating that an alleged user is interacting with the electronic network; and
   in response to receipt of the network data, (i) identifying, by the processing circuitry, a value of a behavior factor from the network data, (ii) comparing the value of the behavior factor with the histogram to identify a bin of the histogram that encompasses the behavioral factor; and (iii) indicating anomalous use of the electronic network in response to the identified bin of the histogram having a lower value than values of other bins in the histogram,
   wherein generating the histogram includes performing multiple bin-reduction iterations, each bin reduction iteration including (i) selecting, by the processing circuitry, a group of adjacent bins of the histogram for combination into a combined bin, the group of bins selected to minimize differences between a value of the combined bin and the value of each of the bins in that group, and (ii) combining the bins of the selected group to form the combined bin, the combined bin replacing the bins of the selected group in the histogram and the value of the combined bin being based on the values of the bins in the selected group, and
   wherein the network data indicating that an alleged user is interacting with the electronic network includes network data indicating that the user is initiating a VPN (Virtual Private Network) session to obtain remote access to the electronic network.

2. A method as in claim 1, further comprising, prior to generating the histogram, obtaining prior network data from the electronic network, the prior network data including multiple values of the user behavior factor of the user.

3. A method as in claim 1, wherein selecting a group of adjacent bins of the histogram includes:
   for each group of N adjacent bins of the histogram, (i) performing a trial combination operation on that group to produce a trial combined bin and (ii) computing an error based on a difference between the value of each bin of that group and a value of the trial combined bin; and
   providing the selected group as the group of N adjacent bins for which the computed error is a minimum over all the groups of N adjacent bins of the histogram.

4. A method as in claim 3, wherein each bin of the histogram also has a width equal to a difference between a maximum and a minimum of the range of the user behavior factor represented by that bin,
   wherein a width of each trial combined bin is a sum of the widths of the adjacent bins in that group, and
   wherein the value of the trial combined bin is a weighted average of the values of the adjacent bins in that group.

5. A method as in claim 3, wherein computing the error includes, for each group of adjacent bins of the histogram:
   generating a respective absolute difference between the value of each bin in that group and the value of that trial combined bin; and
   producing, as the error, a weighted average of the generated differences in that group.

6. A method as in claim 5, further comprising terminating further bin-reduction iterations in response to a minimum error produced across all groups of adjacent bins in a current bin-reduction iteration being greater than a predetermined threshold.

7. A method as in claim 5, further comprising terminating further bin-reduction iterations in response to a number of bin-reduction iterations reaching a predetermined maximum number of bin-reduction iterations.

8. A method as in claim 1, wherein N equals two, such that each group of N adjacent bins is a pair of adjacent bins.

9. A computer program product including a non-transitory, computer-readable storage medium which stores executable code, which when executed by a computer, causes the computer to perform a method of identifying anomalous use of an electronic network, the method comprising:
   generating a histogram from values of a user behavior factor of a user, the histogram including bins, each bin (i) representing a range of the user behavior factor and (ii) having a value indicative of a relative frequency of the behavior factor in the range represented by that bin;
   receiving, after generating the histogram, network data indicating that an alleged user is interacting with the electronic network; and
   in response to receipt of the network data, (i) identifying a value of a behavior factor from the network data, (ii) comparing the value of the behavior factor with the histogram to identify a bin of the histogram that encompasses the behavioral factor; and (iii) indicating anomalous use of the electronic network in response to the identified bin of the histogram having a lower value than values of other bins in the histogram,
   wherein generating the histogram includes performing multiple bin-reduction iterations, each bin reduction iteration including (i) selecting a group of adjacent bins of the histogram for combination into a combined bin, the group of bins selected to minimize differences between a value of the combined bin and the value of each of the bins in that group, and (ii) combining the bins of the selected group to form the combined bin, the combined bin replacing the bins of the selected group in the histogram and the value of the combined bin being based on the values of the bins in the selected group, and
   wherein indicating anomalous use of the electronic network includes sending an alert to a UBA (User Behavior Analytics) administrator.

10. A computer program product as in claim 9, wherein the method further comprises, prior to generating the histogram, obtaining prior network data from the electronic network, the prior network data including multiple values of the user behavior factor of the user.

11. A computer program product as in claim 9, wherein selecting a group of adjacent bins of the histogram includes:
for each group of N adjacent bins of the histogram, (i) performing a trial combination operation on that group to produce a trial combined bin and (ii) computing an error based on a difference between the value of each bin of that group and a value of the trial combined bin; and
providing the selected group as the group of N adjacent bins for which the computed error is a minimum over all the groups of N adjacent bins of the histogram.

12. A computer program product as in claim 11, wherein each bin of the histogram also has a width equal to a difference between a maximum and a minimum of the range of the user behavior factor represented by that bin,
wherein a width of each trial combined bin is a sum of the widths of the adjacent bins in that group, and
wherein the value of the trial combined bin is a weighted average of the values of the adjacent bins in that group.

13. A computer program product as in claim 11, wherein computing the error includes, for each group of adjacent bins of the histogram:
generating a respective absolute difference between the value of each bin in that group and the value of that trial combined bin; and
producing, as the error, a weighted average of the generated differences in that group.

14. A computer program product as in claim 13, wherein the method further comprises terminating further bin-reduction iterations in response to a minimum error produced across all groups of adjacent bins in a current bin-reduction iteration being greater than a predetermined threshold.

15. A computer program product as in claim 13, further comprising terminating further bin-reduction iterations in response to a number of bin-reduction iterations reaching a predetermined maximum number of bin-reduction iterations.

16. A computer program product as in claim 9, wherein N equals two, such that each group of N adjacent bins is a pair of adjacent bins.

17. An electronic apparatus constructed and arranged to identify anomalous use of an electronic network, the electronic apparatus including:
a network interface;
memory; and
controlling circuitry couple to the memory, the controlling circuitry being constructed and arranged to:
generate a histogram from values of a user behavior factor of a user, the histogram including bins, each bin (i) representing a range of the user behavior factor and (ii) having a value indicative of a relative frequency of the behavior factor in the range represented by that bin;
receive, after generating the histogram, network data indicating that an alleged user is interacting with the electronic network; and
in response to receipt of the network data, (i) identify a value of a behavior factor from the network data, (ii) compare the value of the behavior factor with the histogram to identify a bin of the histogram that encompasses the behavioral factor; and (iii) indicate anomalous use of the electronic network in response to the identified bin of the histogram having a lower value than values of other bins in the histogram,
wherein the controlling circuitry constructed and arranged to generate the histogram is further constructed and arranged to perform multiple bin-reduction iterations, each bin reduction iteration including (i) selecting, by the processing circuitry, a group of adjacent bins of the histogram for combination into a combined bin, the group of bins selected to minimize differences between a value of the combined bin and the value of each of the bins in that group, and (ii) combining the bins of the selected group to form the combined bin, the combined bin replacing the bins of the selected group in the histogram and the value of the combined bin being based on the values of the bins in the selected group, and
wherein the network data indicating that an alleged user is interacting with the electronic network includes network data indicating that the user is initiating a VPN (Virtual Private Network) session to obtain remote access to the electronic network.

18. An electronic apparatus as in claim 17, wherein the controlling circuitry is further constructed and arranged to, prior to generating the histogram, obtain prior network data from the electronic network, the prior network data including multiple values of the user behavior factor of the user.

19. An electronic apparatus as in claim 17, wherein the controlling circuitry constructed and arranged to select the group of adjacent bins of the histogram is further constructed and arranged to:
for each group of N adjacent bins of the histogram, (i) perform a trial combination operation on that group to produce a trial combined bin and (ii) compute an error based on a difference between the value of each bin of that group and a value of the trial combined bin; and
provide the selected group as the group of N adjacent bins for which the computed error is a minimum over all the groups of N adjacent bins of the histogram.

20. An electronic apparatus as in claim 19, wherein each bin of the histogram also has a width equal to a difference between a maximum and a minimum of the range of the user behavior factor represented by that bin,
wherein a width of each trial combined bin is a sum of the widths of the adjacent bins in that group, and
wherein the value of the trial combined bin is a weighted average of the values of the adjacent bins in that group.

* * * * *